Dec. 9, 1969  J. A. BOWLIN  3,482,859
PIPE JOINT
Original Filed June 9, 1967
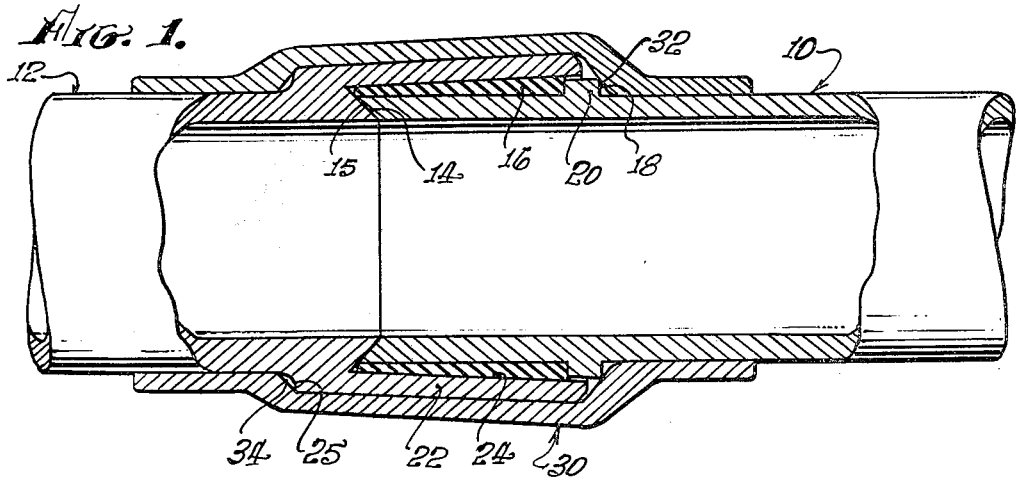
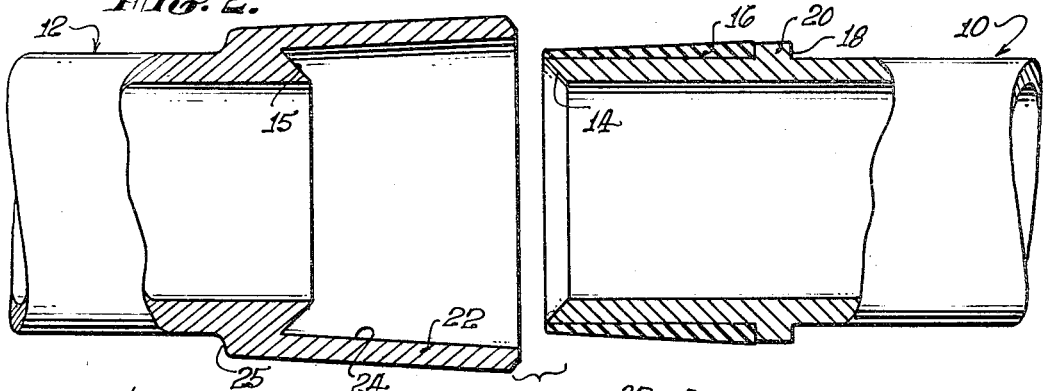
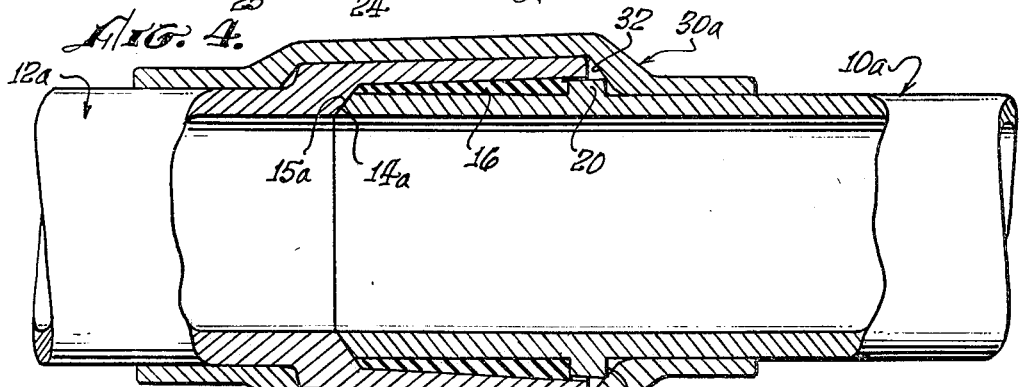
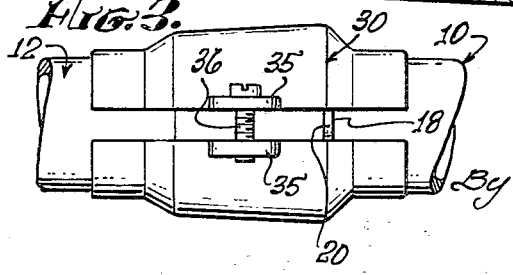
INVENTOR.
JOHN A. BOWLIN,
By Jean M. Roberts
ATTORNEY.

United States Patent Office

3,482,859
Patented Dec. 9, 1969

---

3,482,859
PIPE JOINT
John A. Bowlin, P.O. Box 542, Lucerne
Valley, Calif. 92356
Continuation of application Ser. No. 645,001, June 9,
1967. This application Nov. 4, 1968, Ser. No. 774,583
Int. Cl. F16l *19/06*
U.S. Cl. 285—332.3      10 Claims

ABSTRACT OF THE DISCLOSURE

One pipe end has an annular tapered nose with a tapered elastomeric sealing sleeve embracing the pipe just back of the nose and with the pipe formed with an outer circumferential rearwardly facing shoulder back of the sealing sleeve. The second pipe end has an inner circumferential tapered seat to mate with the nose of the first pipe end and the second pipe end has a flared entrance extending forward from the annular seat, the flared entrance embracing the sealing sleeve with wedging action. In addition the second pipe end is formed with a rearwardly facing outer circumferential shoulder. Finally, an outer coupling sleeve holds the two pipe ends together and for this purpose has two inner circumferential sloping shoulders which cooperate with the rearwardly facing shoulders of the two pipe ends respectively for camming action to maintain the tapered nose of the first pipe end in tight sealing contact with the inner tapered seat of the second pipe end. The tapered elastomeric collar provides a secondary seal.

---

This application is a continuation of application Ser. No. 645,001 filed June 9, 1967, now abandoned.

BACKGROUND OF THE INVENTION

As is well known, a conventional pipe joint relies upon the mating of internal and external screw threads. A highly paid skilled workman commonly makes up such a joint and by virtue of the character of the joint a substantial time period is required to complete the joint with the cost of the joint determined accordingly.

A second disadvantage of convention pipe joints is that the pipe joint necessarily provides inner circumferential shoulders and restrictions which create resistance to fluid flow through the pipe joint and it is common practice to compute the total pressure drop through a pipeline on the basis not only of the internal diameter of the pipeline but also on the basis of the necessary pressure drop at each of the joints.

It follows from the foregoing comments on the prior art that there is a pressing need for a pipe joint construction which can be completed by a relatively unskilled workman and which can be completed in a relatively short period of time to make the overall cost of the joint exceptionally economical. It further follows from the foregoing comment that a second need is for a pipe joint which does not create local resistance to fluid flow, in other words a pipe joint in which the inner circumferential surfaces of the two pipe ends are substantially flush with each other when the joint is made up.

The present invention meets these needs for a pipe joint that does not require a highly skilled workman and which may be made up in a relatively short period of time and which does not create local resistance to fluid flow with consequent local pressure drop.

SUMMARY OF THE INVENTION

Broadly described, the joint for interconnecting a first pipe end and a second pipe end involves a primary seal formed by a tapered annular nose of one pipe end mating with an annular tapered seat of the other pipe end, a secondary seal created by the wedging compression of an annular elastomeric sealing member embracing one of the pipe ends, and a coupling means that embraces the two pipe ends in engagement with the outer shoulders of the two pipe ends to keep the two pipe ends tightly mated together.

More specifically described, the first pipe end has an annular tapered nose that mates with an inner circumferential tapered seat of the second pipe end and the second pipe end has a portion extending forwardly from the annular seat for wedging cooperation with an elastomeric sealing member and surrounds the first pipe end rearward of the tapered nose thereof. Finally, a coupling means embraces the two pipe ends to maintain pressure at the mutually contacting sealing surfaces thereof. In the presently preferred practice of the invention the coupling means comprises a split sleeve having at least one internal tapered shoulder to cooperate with a corresponding external shoulder of one of the pipe ends for camming action to draw the two pipe ends together. The particular sleeve employed in the preferred practice of the invention has two such inner tapered shoulders to cooperate with corresponding shoulders of the two pipe ends for camming action on both of the pipe ends simultaneously. The split sleeve may be tightened by screw action or by other action to create and maintain the desired camming effect. An additional function of the coupling sleeve is to stiffen the joint.

An important feature of the preferred practice of the invention is that the internal diameter of the first pipe rearward of the tapered nose and the internal diameter of the second pipe rearward of the tapered seat are equal, the internal mating surfaces of the two pipe ends being flush for complete elimination of local resistance to fluid flow.

The various features and advantages of the invention may be understood from the following detailed description and the accompanying drawing.

BRIEF DESCRIPTION OF THE DRAWING

In the drawing, which is to be regarded as merely illustrative:

FIG. 1 is a longitudinal section of the presently preferred embodiment of the invention showing the completed joint;

FIG. 2 is a similar view showing the two pipe ends separated from each other prior to the making up of the joint;

FIG. 3 is a side elevational view of the completed joint showing how the coupling sleeve embraces the two pipe ends; and FIG. 4 is a sectional view similar to FIG. 1 showing a modification of the invention.

DESCRIPTION OF THE PREFERRED EMBODIMENT

In the joint construction shown in FIGS. 1–3, a first pipe end generally designated 10 is connected to a second pipe end generally designated 12. The first pipe end 10 has a tapered end rim 14 and the second pipe end 12 has an inner circumferential seat 15 which mates snugly with the tapered end rim. The first pipe end 10 is further provided with an annular elastomeric sealing sleeve 16 which embraces a leading portion of the first pipe and rearwardly of the end rim 14 and rearwardly of the sealing sleeve the first pipe end is formed with a rearwardly facing external shoulder 18. In the present practice of the invention, the external shoulder 18 is formed by an outer circumferential rib 20 which forms a forwardly facing outer circumferential shoulder which serves as a backing for the sealing member 16.

The second pipe end 12 has a leading portion 22 with an inner flared surface 24 which mates with the tapered sealing sleeve 16 for wedging compression of the sealing sleeve. In the present embodiment of the invention the angle of tapered of the inner flared surface 24 relative to the axis of the pipe end is approximately 3°. It is to be noted that when the tapered end rim 14 firmly mates with the tapered seat 15, the leading portion 22 of the pipe end 12 radially compresses the elastomeric sealing sleeve 16 by wedging action. Thus a primary metal to metal seal is formed by the cooperation of the tapered end rim 14 with the tapered seat 15 and a secondary yielding seal is formed by the compression of the tapered elastomeric sleeve 16 between the leading portion 22 of the second pipe end 12 and the leading portion of the first pipe end.

Within the scope of the invention any suitable coupling means may be provided to draw the two pipe ends together and to maintain the two pipe ends under mutual sealing pressure. For this purpose the second pipe end 12 has an external rearwardly facing shoulder 25 which in this particular embodiment of the invention is a continuous circumferential shoulder, but need not be so. The coupling means cooperates with the rearwardly facing shoulder 18 of the first pipe end 10 and the rearwardly facing shoulder 25 of the second pipe end 12.

In the construction shown, the coupling means comprises a split sleeve generally designated 30 which preferably is made in two longitudinal halves as indicated in FIG. 3. As may be seen in FIG. 1, the coupling sleeve 30 has a first tapered inner circumferential shoulder 32 which is shaped for cam action on the external shoulder 18 of the first pipe end 10 and the clamping sleeve is further formed with a second inner circumferential shoulder 34 to cooperate with the external shoulder 25 of the second pipe end 12 with camming action. It is to be understood that although both of the internal shoulders 32 and 34 of the coupling sleeve 30 are designed for cam action on the corresponding external shoulders 18 and 25, nevertheless, the coupling function of the sleeve may be carried out with cam action at only one of the two pairs of cooperating shoulders.

Where the coupling means is in the form of a coupling sleeve 30 made in two longitudinal halves, any suitable provision may be made for drawing the two halves together to contract the sleeve radially to create the desired cam action for drawing the two pipe ends together. For example, as shown in FIG. 3, each of the two halves of the split sleeve 30 may be provided with ears 35 on the opposite sides of the sleeve, thus providing a pair of confronting ears 35 on opposite sides of the joint. In the construction shown the two ears 35 of each pair of ears on the opposite sides of the joint are interconnected by a screw 36 which extends through an unthreaded aperture in one of the ears and threads into a tapped aperture in the other ear. It will be readily appreciated, however, that the coupling sleeve 30 may be made in one piece, the sleeve being split longitudinally and the split being bridged by a screw 36 in cooperation with a pair of ears 35. Thus FIG. 3 illustrates both forms of the clamping sleeve, i.e., the form in which the coupling sleeve is made in two separate halves and the form in which the coupling sleeve is made in one piece, the single piece being split along one side of the sleeve to form two confronting edges.

The manner in which the described pipe joint carries out its purpose may be readily understood from the foregoing description. It is an exceedingly simple task to telescope the two pipe ends together and then to add the coupling sleeve and to tighten the coupling sleeve to provide the required pressure at the mutually contacting sealing surfaces of the joint structure. It is apparent that no skill is require to assemble the joint and that the joint may be completed in a short period of time which may amount to only a few seconds. In one instance, for example, a skilled plumber completed a pipe joint between two confronting pipe ends by means of a conventional internally threaded coupling and took ten minutes to make the joint. In contrast an unskilled workman assembled the new joint in twenty seconds. It is importannt to note in FIG. 1 that the inner circumferenial surfaces of the two pipe ends are flush with each other, there being no restriction or internal shoulder to create local resistance and consequent local pressure drop at the joint.

FIG. 4 illustrates the fact that the taper of the end rim 14 and the cooperating seat 15 may be reversed. Thus in FIG. 1 the end rim 14 of the first pipe end is a female means and the cooperating tapered seat 15 is a male means, whereas in FIG. 4 the end rim 14a of the first pipe end 10a is a male means and the cooperating tapered seat 15a of the second pipe end 12a is a female means. In all other respects the joint construction shown in FIG. 4 is substantially identical with the joint construction shown in FIGS. 1–3.

My description in specific detail of the presently preferred embodiments of the invention will suggest various changes, substitutions and other departures from my disclosure within the scope of the appended claims.

In the claims: the leading portion of the first pipe end 10 is termed the first leading portion and the leading portion 22 of the second pipe end 12 is termed the second leading portion; the rearwardly facing outer circumferential shoulder 18 of the first pipe end 10 is termed the first outer shoulder; the forwardly facing shoulder formed by the rib 20 is termed the second outer shoulder; and the rearwardly facing outer circumferential shoulder 25 of the second pipe end 12 is termed the third outer shoulder. It is to be noted that the coupling sleeve 30 has an inner circumferential shoulder 32 that is paired with the first outer shoulder 18 of the first pipe end 10 and has an inner circumferential shoulder 34 that is paired with the third outer shoulder 25 of the second pipe end 12.

I claim:

1. In a pipe joint for releasably interconnecting a first pipe end and a second pipe end, the combination of:
    a first pipe end having a rearwardly facing first outer shoulder, a forwardly facing second outer shoulder forward of the first shoulder and a first leading portion extending forward from the second outer shoulder, said first leading portion having a first leading rim;
    an elastomeric sleeve embracing said first leading portion and terminating short of said first leading rim;
    said second pipe end having a rearwardly facing third outer shoulder and a second leading portion extending forward from said third outer shoulder, said second leading portion being telescoped over said sleeve and having a second leading rim shaped and dimensioned complementary to and sealingly abutting said first leading rim in direct contact therewith said second-leading portion, at least adjacent its terminal end, having an inner diameter larger than the outer diameter of said first and second outer shoulders;
    at least one of said sleeve and the interior of said second leading portion being tapered causing radial compression and sealing engagement of the sleeve between the first leading portion and the second leading portion in response to forward axial movement of the second leading portion while the two leading portions are in telescoped relation; and
    coupling means embacing said second leading portion in engagement with said first and third outer shoulders keeping the two leading portions telescoped together with said two rims in sealing pressure engagement with each other.

2. A combination as set forth in claim 1 in which both said sleeve and the interior of said second leading portion are tapered in the same axial direction.

3. A combination as set forth in claim 1 in which said second leading portion is dimensioned to telescope over the portion of the first pipe end that lies between said said and seconds shoulders.

4. A combination as set forth in claim 1 in which said second leading portion is formed with an inner circumferential shoulder cooperating with said second outer shoulder and with the two leading portions to captivate the sleeve.

5. A combination as set forth in claim 1 in which the inside diameters of the two pipes are substantially equal to and make the inner circumferential surfaces of the two pipe ends substantially flush with each other.

6. A combination as set forth in claim 1 in which said sleeve is tapered at an angle of less than 10 degrees relative to the axis of the sleeve.

7. A combination as set forth in claim 6 in which the axial dimension of said sleeve and of said first leading portion is greater than one-half the diameter of the first pipe end.

8. A combination as set forth in claim 1 in which said coupling means is radially contractable and has an inner circumferential shoulder paired with said first outer shoulder for engagement therewith and has an inner circumferential shoulder paired with said third outer shoulder for engagement therewith, at least one shoulder of the two pairs of shoulders being of a configuration for caming action to draw the two pipe ends together for sealing pressure between said two rims to form a primary seal in response to radial contraction of the coupling means.

9. A combination as set forth in claim 1 in which said two rims are tapered.

10. A combination as set forth in claim 1 in which one of said two rims is in the form of a conical nose and the other of the two rims is in the form of a conical seat for the nose.

References Cited

UNITED STATES PATENTS

| | | | |
|---|---|---|---|
| 1,985,325 | 12/1934 | Nathan | 285—374 X |
| 2,322,587 | 6/1943 | Payne | 285—332.3 X |
| 3,015,500 | 1/1962 | Barnett | 285—332.3 X |

FOREIGN PATENTS

| | | |
|---|---|---|
| 1,404,121 | 5/1965 | France. |

DAVID J. WILLIAMOWSKY, Primary Examiner

DAVE W. AROLA, Assistant Examiner

U.S. Cl. X.R.

285—347, 351, 373